US012525657B2

(12) United States Patent
Sekol et al.

(10) Patent No.: US 12,525,657 B2
(45) Date of Patent: Jan. 13, 2026

(54) SYSTEM FOR DETECTING ELECTROLYTE LEAKS DURING BATTERY MANUFACTURING (71) Applicant: GM GLOBAL TECHNOLOGY OPERATIONS LLC, Detroit, MI (US)

(72) Inventors: Ryan Curtis Sekol, Grosse Pointe Woods, MI (US); James R. Salvador, East Lansing, MI (US); Michelle H. Wiebenga, Farmington Hills, MI (US); William Reginald Collin, Dearborn, MI (US); Christopher Brady, Madison Heights, MI (US); Robert H. Dietze, Jr., Brighton, MI (US); Jennifer Therese Bracey, Holly, MI (US); Houssen Yang, Warren, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 339 days.

(21) Appl. No.: 18/112,552

(22) Filed: Feb. 22, 2023

(65) Prior Publication Data

US 2024/0283033 A1 Aug. 22, 2024

(51) Int. Cl.
*H01M 10/42* (2006.01)
*G01M 3/04* (2006.01)
*G01N 21/25* (2006.01)
*G01N 21/71* (2006.01)
*H01M 10/44* (2006.01)
*H01M 10/48* (2006.01)

(52) U.S. Cl.
CPC ......... *H01M 10/4228* (2013.01); *G01M 3/04* (2013.01); *G01N 21/25* (2013.01); *G01N 21/71* (2013.01); *H01M 10/44* (2013.01); *H01M 10/48* (2013.01)

(58) Field of Classification Search
CPC .. H01M 10/4228; H01M 10/44; H01M 10/48; G01M 3/04; G01N 21/25; G01N 21/71
USPC ...................................................... 340/636.1
See application file for complete search history.

(56) References Cited

U.S. PATENT DOCUMENTS

| 4,904,951 | A  | * | 2/1990 | Molina | ..................... H03H 7/18 330/307 |
| 5,380,978 | A  | * | 1/1995 | Pryor | ................. B23K 26/0846 219/121.79 |
| 2005/0079620 | A1 | * | 4/2005 | Eberhard | .......... H01M 10/4285 436/1 |
| 2015/0129431 | A1 | * | 5/2015 | Winther-Jensen | .......................... H01M 4/8605 205/630 |
| 2015/0188054 | A1 | * | 7/2015 | Ghandi | .................. H10K 30/20 252/500 |
| 2019/0280337 | A1 | * | 9/2019 | Narita | ............... H01M 10/0568 |

(Continued)

*Primary Examiner* — Naomi J Small (57) ABSTRACT

A method for testing a battery component for leakage includes generating a sample from a battery component storing electrolyte using a Fourier Transform infrared (FT-IR) spectrometer, comparing absorbance levels of the sample at N predetermined frequencies to N predetermined thresholds, respectively, where N is an integer greater than one; and selectively detecting at least one of an electrolyte leak and generating an electrolyte concentration estimate in response to the comparison. The battery component is selected from a group consisting of a battery cell, a battery module, and a battery pack.

17 Claims, 6 Drawing Sheets

(56) References Cited

U.S. PATENT DOCUMENTS

2023/0040106 A1* 2/2023 Youn ................ H01M 10/4228
2024/0113330 A1* 4/2024 Tsutsui ............... H01M 10/058

* cited by examiner

SYSTEM FOR DETECTING ELECTROLYTE LEAKS DURING BATTERY MANUFACTURING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to leak detection systems, and more particularly to leak detection systems for detecting electrolyte leaks during battery manufacturing.

Electric vehicles such as battery electric vehicles and hybrid vehicles include a battery pack including one or more battery modules each including one or more battery cells. The battery cells are arranged in enclosure such as a pouch or other enclosure. Groups of battery cells are arranged in a battery module and/or battery pack including an enclosure. Electrolyte is added to the enclosure of the battery cells.

SUMMARY

A method for testing a battery component for leakage includes generating a sample from a battery component storing electrolyte using a Fourier Transform infrared (FT-IR) spectrometer; comparing absorbance levels of the sample at N predetermined frequencies to N predetermined thresholds, respectively, where N is an integer greater than one; and selectively detecting at least one of an electrolyte leak and generating an electrolyte concentration estimate in response to the comparison. The battery component is selected from a group consisting of a battery cell, a battery module, and a battery pack.

In other features, the method includes arranging the battery component in an enclosure prior to generating the sample from the battery component. The method includes performing an electrical test of the battery component prior to generating the sample. The electrical test of the battery component comprises at least one of charging and discharging of the battery component. The method includes using at least one of a thermal interface of the battery component and an external heater to heat the battery component prior to generating the sample.

In other features, the method includes using a tube to generate the sample from a predetermined location of the battery component. The method includes arranging the battery component in an enclosure; and drawing vacuum pressure in the enclosure. The sample is generated at the vacuum pressure.

In other features, the battery component comprises a battery cell, and the method further comprises generating the sample after trimming external tabs of the battery cell using a laser. N is equal to 3.

In other features, the method includes performing at least one of a principal component analysis and a chemometric analysis on the sample and selectively detecting the electrolyte leak in response to the at least one of the principal component analysis and the chemometric analysis.

A method for testing a battery component for leakage includes generating a first sample from a battery component storing electrolyte using a total volatile organic compound (VOC) sensor; comparing an output of the total VOC sensor to a predetermined threshold; generating a second sample from the battery component using a Fourier-Transform infrared (FTIR) spectrometer in response to the output of the total VOC sensor being greater than the predetermined threshold; and selectively detecting an electrolyte leak in response to the second sample from the FTIR spectrometer. The battery component is selected from a group consisting of a battery cell, a battery module, and a battery pack.

In other features, the method includes comparing absorbance levels of the second sample at N predetermined frequencies to predetermined thresholds, where N is an integer greater than one. The method includes performing at least one of a principal component analysis and a chemometric analysis on the second sample and selectively detecting the electrolyte leak in response to the at least one of the principal component analysis and the chemometric analysis.

In other features, the method include arranging the battery component in an enclosure prior to generating the second sample from the battery component. The method include performing an electrical test of the battery component prior to generating the second sample. The electrical test of the battery component comprises at least one of charging and discharging of the battery component.

In other features, the method includes using at least one of a thermal interface of the battery component and an external heater to heat the battery component prior to generating the second sample. The method includes using a tube to generate the second sample from a predetermined location of the battery component. The method includes arranging the battery component in an enclosure; and drawing vacuum pressure in the enclosure. The second sample is generated at the vacuum pressure.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While the electrolyte leak detection systems and methods are described herein in the context of an electric vehicle, the electrolyte leak detection systems can be used for stationary applications or other applications.

Electric vehicles include a battery pack with one or more battery modules each including a plurality of battery cells.

The battery cells include a plurality of anode electrodes, cathode electrodes, separators, and/or electrolyte arranged in an enclosure. The electrolyte includes salts (e.g., lithium salts) and solvents that are typically flammable. Leakage of electrolyte from one battery cell may cause performance differences between the battery cells of the battery pack or module, which may cause other issues. Therefore, detecting leakage of electrolyte during manufacturing is important.

The present disclosure relates to an electrolyte leak detection system including a Fourier Transform infrared (FTIR) (spectrometer) to detect leakage of electrolyte from a battery component including electrolyte (such as a battery cell, module and/or pack).

In some examples, the FTIR spectrometer is used to detect small electrolyte leaks that occur during electrical testing of the battery component. For example, the electrical testing may involve cycling of the battery pack through charging and discharging cycles. In other examples, the battery may be heated using a thermal interface of the battery component or an external heater.

During electrical testing, the battery pack experiences increased temperature and swelling of the enclosures of the battery cells may occur. Electrolyte leaks are more likely to occur when the battery cells are tested. In some examples, the electrolyte leak may be caused by either a torn/punctured pouch or a poor seal. For example, the FTIR spectrometer can detect 130 ppm of the electrolyte (e.g., 10% of a droplet of liquid in 10 liters of air).

The electrolyte leak test according to the present disclosure can be performed inline during manufacturing using the FTIR spectrometer to detect electrolyte leaks. In all examples, the electrolyte is detected without interference from nitrogen or oxygen. The electrolyte can be identified by analyzing absorbance at specific wavelengths in the sample data output by the FTIR spectrometer (e.g., with or without background signals being subtracted). A controller is configured to use wavelength identification and/or advanced data analytic techniques such as principal component analysis (PCA) or other chemometric techniques are performed to allow the electrolyte to be accurately detected even in the presence of other IR active VOC's. If an electrolyte leak is detected, the electrolyte detection system generates an alarm event (e.g., audible alarm, visual alarm, computer message, etc.) to notify operators of the electrolyte leak.

To speed up the testing process, the FTIR system can be used in conjunction with a total volatile organic compound (VOC) sensor. Measurement of total VOCs is typically faster than the analysis using the FTIR spectrometer and more able to quickly respond to rapid changes in air quality. Sampling is initially performed by the total VOC sensor and selectively performed by the FTIR spectrometer depending upon the outcome of the total VOC sensor. Electrolyte components such as dimethyl-diethyl and ethyl-methyl carbonates are very volatile with high rates of evaporation. The total VOC sensor samples the battery component and if the sample is normal (low or no VOCs), the battery component proceeds without testing using the FTIR spectrometer. If the sample of VOCs output by the total VOC sensor is high, the sample is tested using the FTIR spectrometer as well for speciation.

When the electrolyte leak is small, it may not be detected until the last step of the manufacturing process. In some examples, the one or more sensors are used in conjunction with one or more additional steps to enhance the likelihood of detecting the electrolyte leak. Examples, include heating the battery component, cycling the battery component through one or more charging and/or discharging cycles, isolating the pack, etc.

Chemometrics can be used to limit false positives from environmental factors such as cleaning agents or fragrances from health and beauty products. Co-monitoring of water vapor and carbon dioxide levels and controlling for them in the IR spectrum will improve the accuracy of the resulting meta-classification (leak or no leak) as well as the leak severity (low medium or high levels of electrolyte vapor).

Figure 1A:
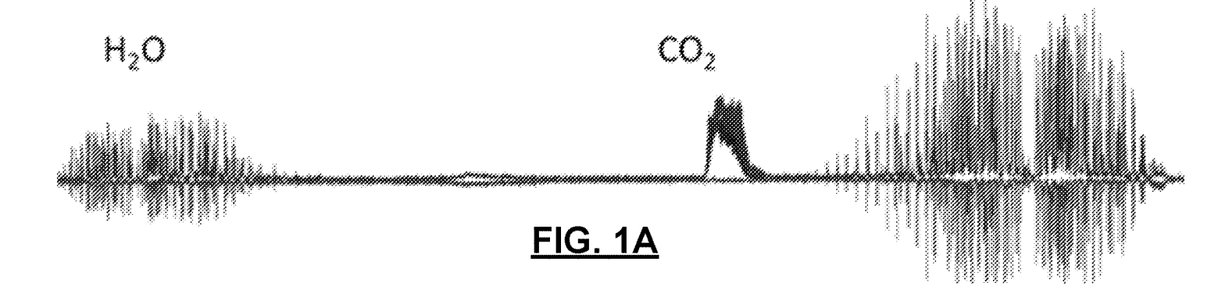
FIGS. 1A and 1B are graphs showing an output of a Fourier Transform Infrared (FTIR) measurement system after the introduction of sealant, thermal interface material (TIM), tape, and/or a battery component including electrolyte into the sampling chamber according to the present disclosure.
Figure 1B:
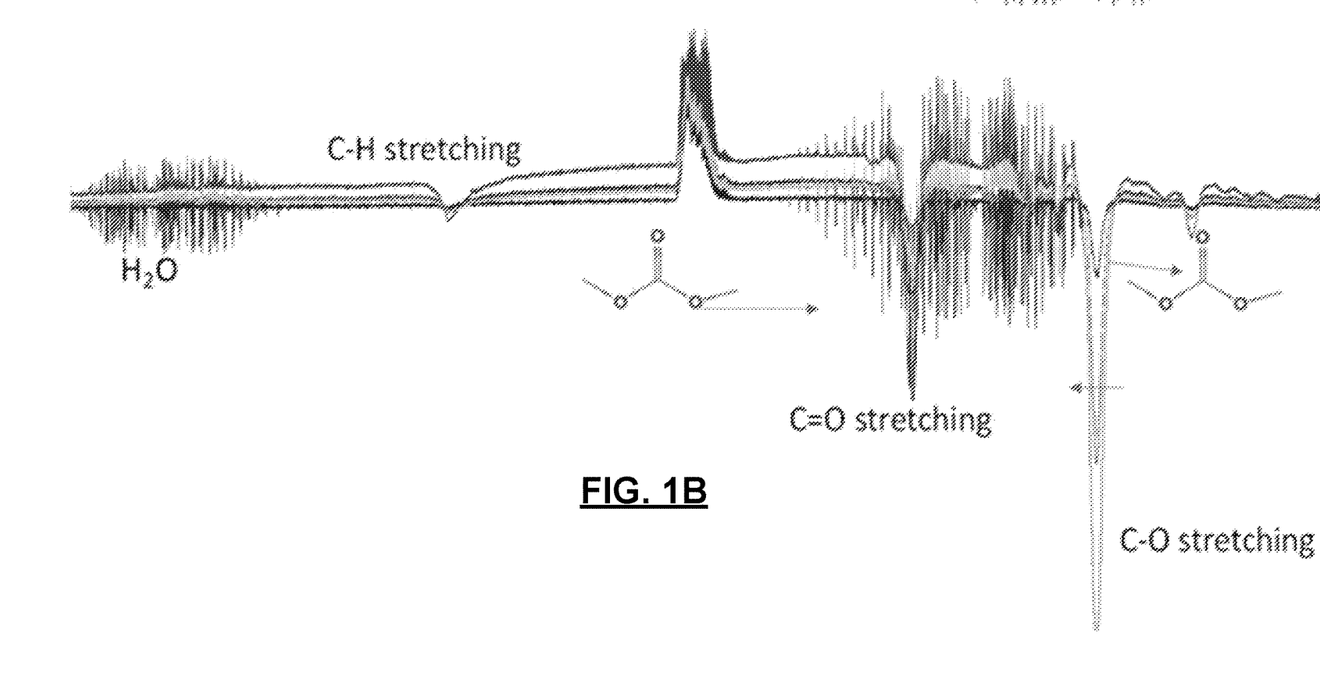

Referring now to FIGS. 1A and 1B, sampling spectral data from the FTIR spectrometer is shown. In FIG. 1A, spectral data for sealant, thermal interface material (TIM), and tape is shown. In FIG. 1B, spectral data for the different levels of electrolyte vapors are shown (with and without air, TIM and/or sealant). The presence of the electrolyte is identified due to the presence of peaks at one or more frequencies. In other words, absorbance levels at one or more of these frequencies are compared to predetermined thresholds and an electrolyte leak is declared in response to the comparison. Other VOCs that are present (such as those from sealer, TIM, adhesive tape) do not have peaks in these regions.

In addition to the absorbance peak locations (e.g., frequencies), the relative intensity can also be used to discriminate between specific electrolyte solvent species and other potential background VOCs that also contain carbonyl or ether functional groups. If sufficiently high resolution data is collected in the IR spectrum, rotational bands can also be used to further discriminate between electrolyte components and background VOCs.

Figure 2:
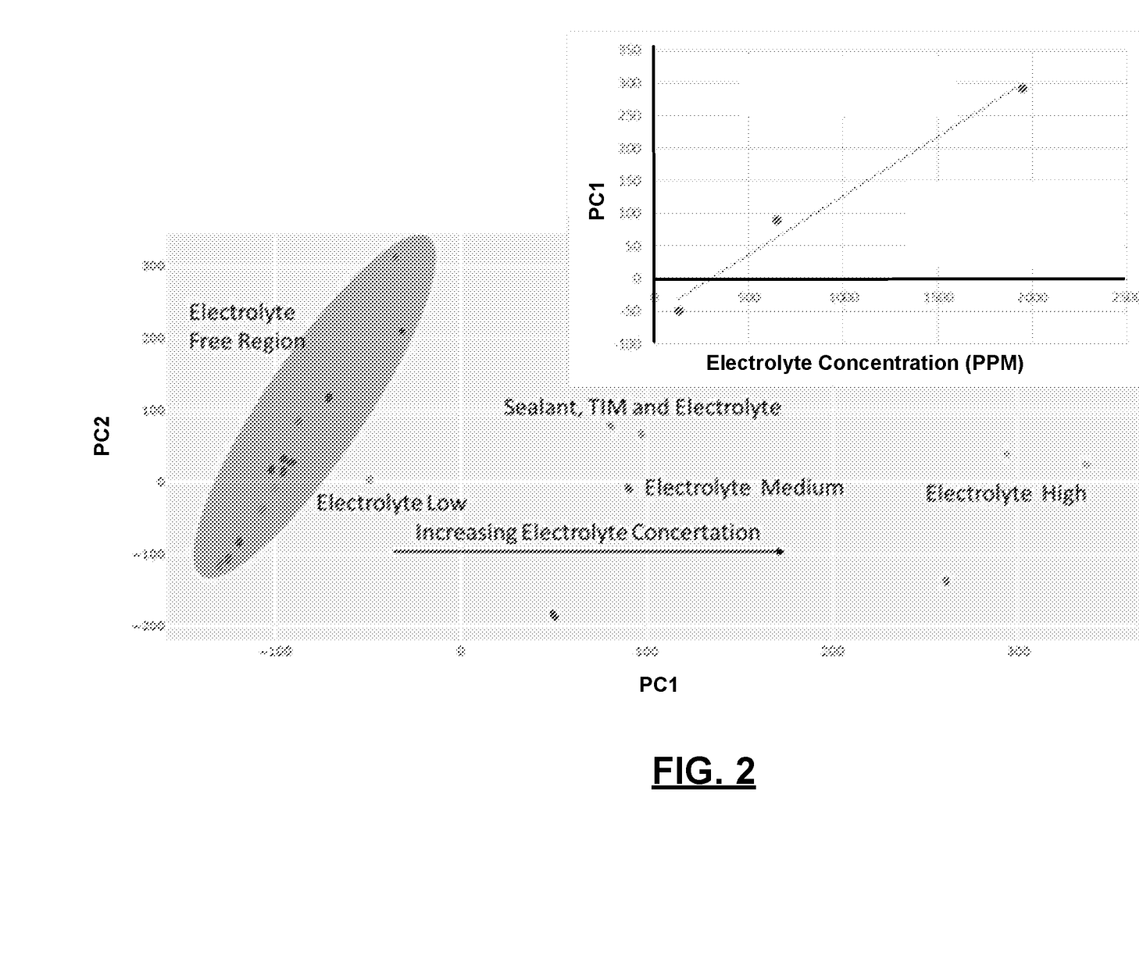
FIG. 2 includes graphs illustrating results of principal component analysis (PCA) according to the present disclosure.

Referring now to FIG. 2, PCA performed on spectra that was not corrected for background (e.g., a worst case scenario) is shown. The proportional response provided by the PCA allows both identification of the electrolyte leak and an estimate of the sensed electrolyte concentration.

PCA of the spectra shows the relationship between the PC1 and the electrolyte concentration. This observation is a byproduct of Beer/Lambert Law $A = c \cdot l \cdot \varepsilon$ (where A is absorbance, c is a molar concentration, l is a path length, and $\varepsilon$ is a molar absorptivity coefficient). Since the entire spectral range from each sample is used to generate the PCA plots, the spectral regions that absorb due to the electrolyte leak will have higher absorbance values while samples without sensed electrolyte present will shift to lower PC1 values. If electrolyte solvent formulation changes, the spectra will be different and the PC1 datapoints will likely cluster in a different region and/or will have a different PC1 versus concentration curve.

One or more techniques may be used to enhance detection of the electrolyte including heating the battery component, cycling the battery component through electrical testing such as one or more charging or discharging cycles, isolating the battery component, isolating locations of the sampling using a tube or snout, or other techniques described further below.

Figure 3:
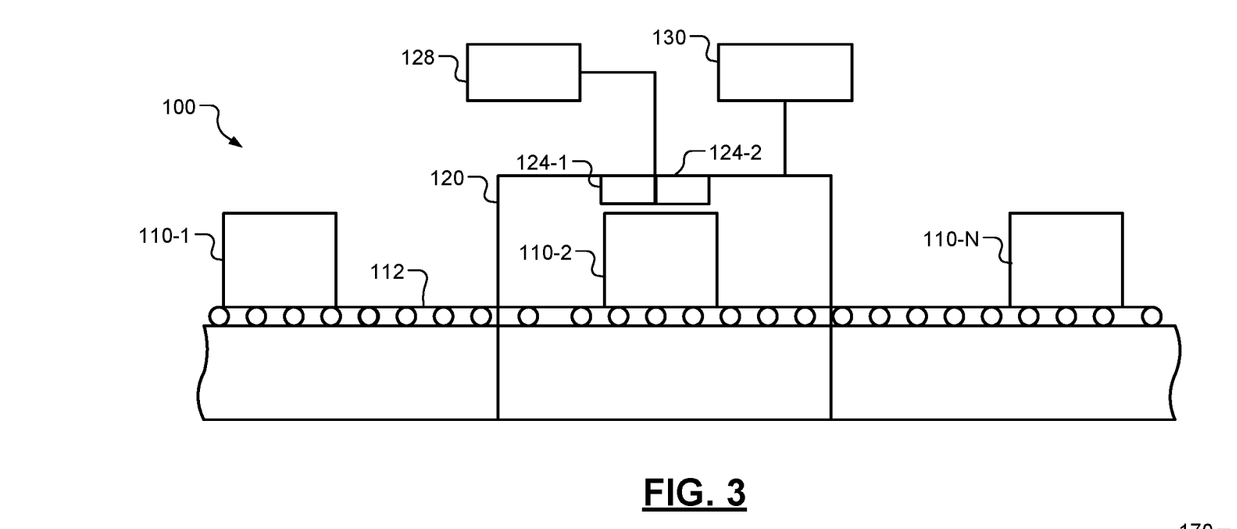
FIGS. 3 to 9 are functional block diagrams of example implementations for sensing electrolyte leakage of a battery component according to the present disclosure.

Referring now to FIG. 3, battery components 110-1, 110-2, . . . , and 110-N including electrolyte (e.g., such as a battery pack, module, or cell) are delivered to or pass through an enclosure 120 where testing is performed with less exposure to other materials in a manufacturing environment. The battery components 110 may be arranged in a housing such as a pouch, cylindrical or prismatic housing, battery tray and cover, or other type of housing. For example, the battery components 110 may include a battery pack that passes through opposite ends of the enclosure 120 on a conveyor 112. Alternately, each battery component 110 may be delivered by a robot or operator from a pickup location to the enclosure 120 for testing and then returned to the pickup location or another location.

As the battery component 10 passes through the enclosure 120, one or more sensors 124 (e.g., 124-1 and 124-2) sample gas such as air surrounding the battery component 110. In some examples, the enclosure 120 includes doors, a curtain, a gas curtain, or other structure located at opposite ends thereof to reduce contamination of the gas inside of the enclosure.

A fan 130 may be used to circulate gas such as air, an inert gas, or other gas within the enclosure 120. The fan 130 may also purge the enclosure 120 after each battery component 110 is tested. In some examples, the sensor 124 comprise an FTIR spectrometer 124-1 and/or the FTIR spectrometer 124-1 and a total VOC sensor 124-2. In some examples, the total VOC sensor 124-2 samples every one of the battery components 110 and the FTIR spectrometer 124-1 senses some of the battery components depending upon the results of the VOC sensor 124-2 as described above. A controller 128 is configured to control the sensors 124, the fan 130 and/or the conveyor 112 and to determine whether or not an electrolyte leak is present and/or a concentration estimate.

For example, the controller 128 is configured to compare absorbance levels at one or more predetermined frequencies to predetermined absorbance thresholds and to determine whether or not an electrolyte leak is present based on the comparison. In other examples, the controller 128 uses PCA and/or chemometrics to identify the electrolyte leak.

Figure 4:
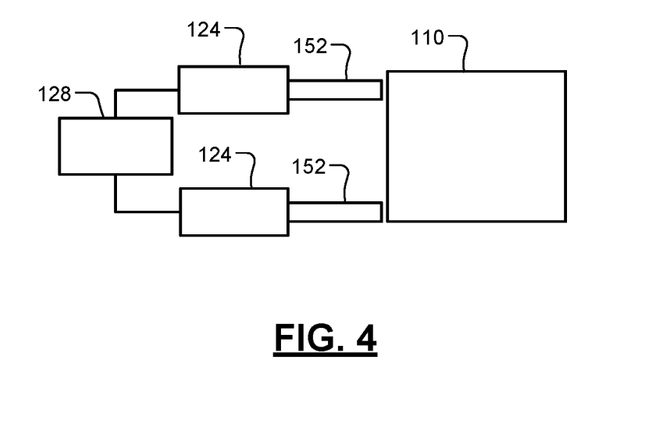

Referring now to FIG. 4, one or more sensors 124 sense specific locations of the battery component 110 though one or more tubes 152, respectively. The tubes 152 reduce errors caused by other materials in a manufacturing environment. The sensors 124 can include the FTIR spectrometer 124-1 and/or the FTIR spectrometer 124-1 and a VOC sensor 124-2. While the battery component 100 is shown outside of an enclosure, an enclosure can be used in addition to the tube 152.

Figure 5:
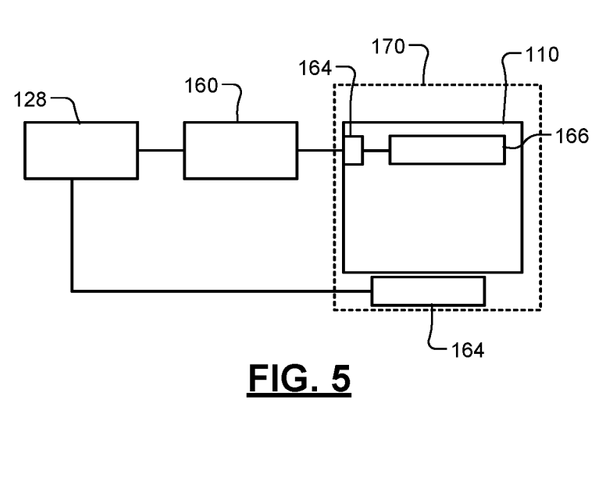
Figure 6:
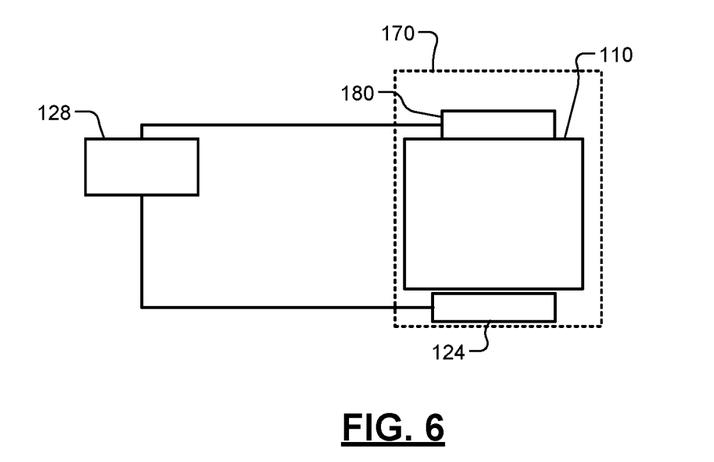

Referring now to FIGS. 5 and 6, the battery component 110 may be heated before testing for electrolyte leaks. In FIG. 5, the controller 128 is configured to heat the battery component 110 via a heater controller 160 connected to a thermal interface 164 of the battery component 110. For example, the heater controller 160 may output power to a resistive heater 166 of the battery component 110. The battery component 110 is heated to a predetermined temperature such as a typical environmental and/or operating temperature and sensing is performed at the predetermined temperature. In FIG. 6, an external heater 180 may be used to heat the battery component 110 instead of an internal heater shown in FIG. 5.

Figure 7:
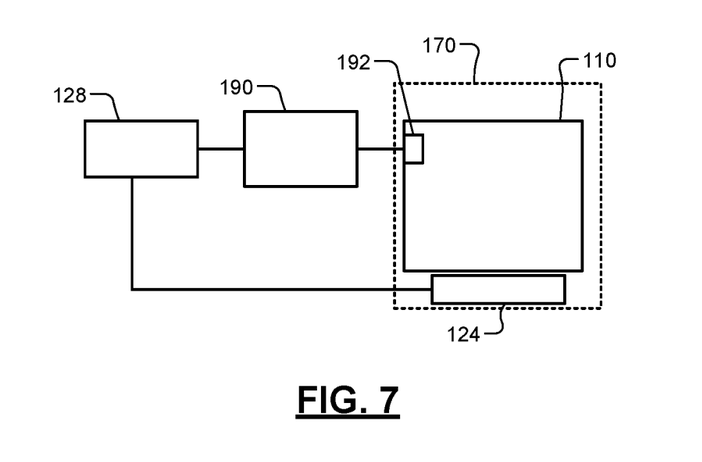

Referring now to FIG. 7, the battery component 110 may be electrically tested by a tester 190 before testing for electrolyte leaks. In some examples, the tester 190 performs one or more charging and discharging cycles or other electrical testing prior to testing for electrolyte leaks.

Figure 8:
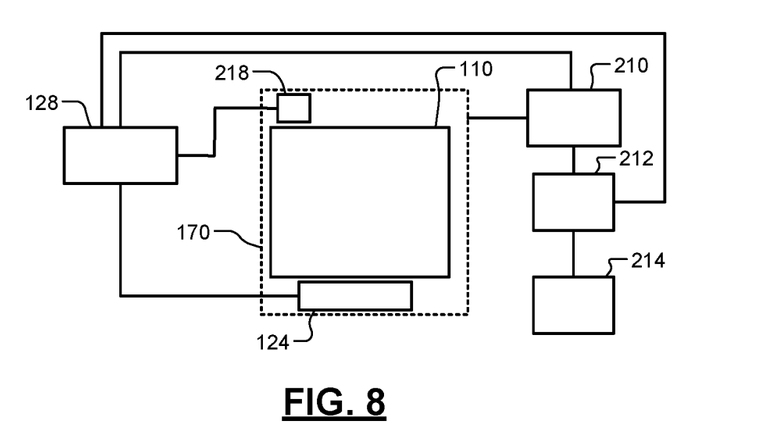

Referring now to FIG. 8, testing of the battery component 110 may be performed in a vacuum or reduced pressure relative to ambient. The battery component 110 is arranged in an enclosure and a fan 212 draws gas from the enclosure to reduce pressure in the enclosure 170. An optional damper 210 and/or a variable speed fan may be used to adjust the vacuum level in the enclosure 170. In some examples, the controller 128 is configured to control pressure in the enclosure 170 based on feedback from a pressure sensor 218 sensing pressure within the enclosure 170. When a desired vacuum level is reached, the controller 128 performs the electrolyte leak test. An output of the fan may be directed to an exhaust system 214.

Figure 9:
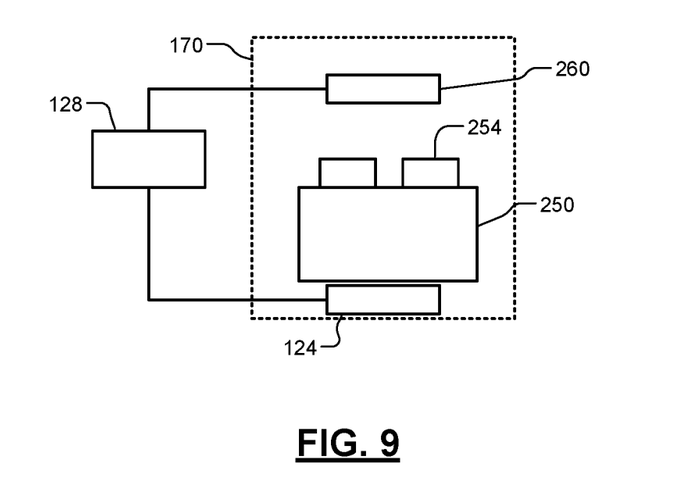

Referring now to FIG. 9, testing of a battery cell 250 including external tabs 254 may be performed during tab trimming using a laser 260 or another device. The electrolyte testing is performed during or after the laser trimming of the external tabs 254. Heating of the battery cell 250 occurs during laser trimming, which increases the likelihood that the electrolyte leak will be detected.

Figure 10:
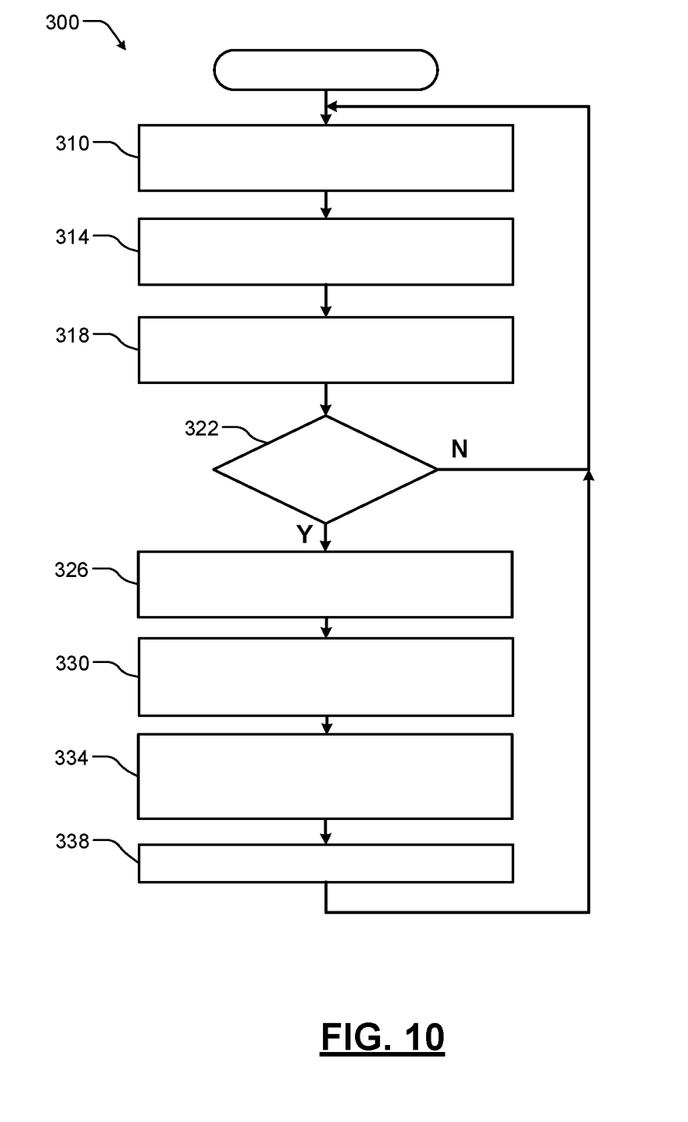
FIG. 10 is a flowchart of a method for performing electrolyte leak testing according to the present disclosure.

Referring now to FIG. 10, a method 300 for performing electrolyte testing is shown. At 310, the method includes optionally arranging a battery component with electrolyte in an enclosure. At 314, the battery component is heated or electrical testing is optionally performed on the battery component. At 318, the battery component is optionally sampled using a total VOC sensor. At 322, the method determines whether the total VOCs are greater than a predetermined threshold. If 322 is false, the method returns to 310 and the next battery component is tested.

If 322 is true, the method samples the battery component using FTIR spectrometer at 326. At 330, the method optionally performs PCA or chemometric analysis. At 334, the method selectively detects an electrolyte leak and/or concentration in response to the output of the FTIR spectrometer and/or results of PCA or chemometrics analysis. At 338, the enclosure is optionally purged and the method returns to 310.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for testing a battery component for leakage, comprising:
    arranging a battery component storing electrolyte in an enclosure;
    drawing vacuum pressure in the enclosure;
    generating a first sample from a battery component storing electrolyte using a total volatile organic compound (VOC) sensor, wherein the first sample is generated at vacuum pressure;
    comparing an output of the total VOC sensor to a predetermined threshold;
    completing testing of the battery component without using a Fourier Transform infrared (FT-IR) spectrometer in response to the output of the total VOC sensor being less than the predetermined threshold;
    generating a second sample from the battery component storing electrolyte using a Fourier Transform infrared (FT-IR) spectrometer only in response to the output of the total VOC sensor being greater than the predetermined threshold, wherein the second sample is generated at vacuum pressure;
    comparing absorbance levels of the second sample at N predetermined frequencies to N predetermined thresholds, respectively, where N is an integer greater than one; and
    selectively detecting an electrolyte leak and generating an electrolyte concentration estimate in response to the comparison,
    wherein the battery component is selected from a group consisting of a battery cell, a battery module, and a battery pack.

2. The method of claim 1, further comprising performing an electrical test of the battery component prior to generating the first sample.

3. The method of claim 2, wherein the electrical test of the battery component comprises at least one of charging and discharging of the battery component.

4. The method of claim 1, further comprising using at least one of a thermal interface of the battery component and an external heater to heat the battery component prior to generating the first sample.

5. The method of claim 1, further comprising using a tube to generate the first sample from a predetermined location of the battery component.

6. The method of claim 1, wherein the battery component comprises a battery cell, and further comprising generating the first sample after trimming external tabs of the battery cell using a laser.

7. The method of claim 1, wherein N is equal to 3.

8. The method of claim 1, further comprising performing at least one of a principal component analysis and a chemometric analysis on the first sample and selectively detecting the electrolyte leak in response to the at least one of the principal component analysis and the chemometric analysis.

9. The method of claim 1, further comprising performing a principal component analysis on an entire spectral range of the second sample to determine a relationship between a first principal component and electrolyte concentration, wherein spectral regions that absorb due to the electrolyte leak have higher absorbance values than spectral regions without sensed electrolyte present.

10. The method of claim 1, further comprising performing a chemometric analysis on the second sample to limit false positives from environmental factors, wherein the chemometric analysis includes co-monitoring water vapor and carbon dioxide levels and controlling for water vapor and carbon dioxide levels in an infrared spectrum.

11. A method for testing a battery component for leakage, comprising:
arranging a battery component storing electrolyte in an enclosure;
drawing vacuum pressure in the enclosure;
generating a first sample from a battery component storing electrolyte using a total volatile organic compound (VOC) sensor, wherein the first sample is generated at vacuum pressure;
comparing an output of the total VOC sensor to a predetermined threshold;
completing testing of the battery component without using a Fourier Transform infrared (FT-IR) spectrometer in response to the output of the total VOC sensor being less than the predetermined threshold;
generating a second sample from the battery component using a Fourier-Transform infrared (FTIR) spectrometer only in response to the output of the total VOC sensor being greater than the predetermined threshold, wherein the second sample is generated at vacuum pressure; and
selectively detecting an electrolyte leak in response to the second sample from the FTIR spectrometer,
wherein the battery component is selected from a group consisting of a battery cell, a battery module, and a battery pack.

12. The method of claim 11, further comprising comparing absorbance levels of the second sample at N predetermined frequencies to predetermined thresholds, where N is an integer greater than one.

13. The method of claim 11, further comprising performing at least one of a principal component analysis and a chemometric analysis on the second sample and selectively detecting the electrolyte leak in response to the at least one of the principal component analysis and the chemometric analysis.

14. The method of claim 11, further comprising performing an electrical test of the battery component prior to generating the second sample.

15. The method of claim 14, wherein the electrical test of the battery component comprises at least one of charging and discharging of the battery component.

16. The method of claim 11, further comprising using at least one of a thermal interface of the battery component and an external heater to heat the battery component prior to generating the second sample.

17. The method of claim 11, further comprising using a tube to generate the second sample from a predetermined location of the battery component.

* * * * *